United States Patent
Kang et al.

(10) Patent No.: US 12,236,023 B2
(45) Date of Patent: Feb. 25, 2025

(54) ELECTRONIC APPARATUS FOR IDENTIFYING A CONTROL SIGNAL BASED ON MOTION INFORMATION AND CONTROL METHOD THEREOF

(71) Applicant: SAMSUNG ELECTRONICS CO., LTD., Suwon-si (KR)

(72) Inventors: Kunsok Kang, Suwon-si (KR); Anant Baijal, Suwon-si (KR); Hyunkyu Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/223,257

(22) Filed: Jul. 18, 2023

(65) Prior Publication Data

US 2024/0045520 A1    Feb. 8, 2024

Related U.S. Application Data

(63) Continuation of application No. PCT/KR2023/006541, filed on May 15, 2023.

(30) Foreign Application Priority Data

Aug. 5, 2022  (KR) .......................... 10-2022-0098118
Sep. 22, 2022 (KR) .......................... 10-2022-0120199

(51) Int. Cl.
  *G06F 3/038*  (2013.01)
  *G06F 3/01*   (2006.01)
  (Continued)

(52) U.S. Cl.
  CPC .............. *G06F 3/038* (2013.01); *G06F 3/013* (2013.01); *G06F 3/0346* (2013.01); *G09G 3/002* (2013.01);
  (Continued)

(58) Field of Classification Search
  None
  See application file for complete search history.

(56) References Cited

U.S. PATENT DOCUMENTS

| 8,323,106 | B2 | 12/2012 | Zalewski |
| 8,325,138 | B2 | 12/2012 | Touma et al. |

(Continued)

FOREIGN PATENT DOCUMENTS

| JP | 2020-521217 A | 7/2020 |
| KR | 10-2011-0025674 A | 3/2011 |

(Continued)

OTHER PUBLICATIONS

International Search Report dated Aug. 2, 2023, issued by the International Searching Authority in International Application No. PCT/KR2023/006541 (PCT/ISA/210).

(Continued)

*Primary Examiner* — Matthew Yeung
(74) *Attorney, Agent, or Firm* — Sughrue Mion, PLLC

(57) ABSTRACT

An electronic apparatus is disclosed. The electronic apparatus includes projection circuitry, a communication interface, and at least one processor connected with the projection circuitry and the communication interface and configure to control the electronic apparatus, and the processor is configured to control the projection circuitry to project an image towards a projection region, receive first motion information from each of a first portable device, a second portable device, and a wearable device through a communication interface after a first portable device, a second portable device, and a wearable device worn by a user are arranged to correspond to the image, identify orientations of each of the first portable device, the second portable device, (Continued)

and the wearable device based on the first motion information, and identify a location of the user based on identified orientations.

21 Claims, 15 Drawing Sheets

(51) Int. Cl.
*G06F 3/0346* (2013.01)
*G09G 3/00* (2006.01)

(52) U.S. Cl.
CPC . *G06F 2203/0384* (2013.01); *G09G 2354/00* (2013.01)

(56) References Cited

U.S. PATENT DOCUMENTS

| | | | |
|---|---|---|---|
| 8,784,203 | B2 | 7/2014 | Zalewski |
| 8,896,527 | B2 | 11/2014 | Ahn |
| 9,244,539 | B2 | 1/2016 | Venable et al. |
| 10,279,254 | B2 | 5/2019 | Mikhailov et al. |
| 10,554,886 | B2 | 2/2020 | Rydberg |
| 10,629,003 | B2 | 4/2020 | Miller et al. |
| 10,661,183 | B2 | 5/2020 | Ikeda et al. |
| 10,712,900 | B2 | 7/2020 | Osman et al. |
| 10,817,047 | B2 | 10/2020 | Chou et al. |
| 11,016,305 | B2 | 5/2021 | Wan et al. |
| 11,044,402 | B1 | 6/2021 | Rydberg |
| 11,610,371 | B2 | 3/2023 | Powderly et al. |
| 2008/0261693 | A1 | 10/2008 | Zalewski |
| 2013/0002550 | A1 | 1/2013 | Zalewski |
| 2013/0072297 | A1* | 3/2013 | Seegers ................. A63F 13/213 463/31 |
| 2014/0306866 | A1 | 10/2014 | Miller et al. |
| 2018/0304153 | A1* | 10/2018 | Hohjoh ................. A63F 13/211 |
| 2018/0350150 | A1 | 12/2018 | Powderly et al. |
| 2019/0356848 | A1 | 11/2019 | Rydberg |
| 2020/0155937 | A1* | 5/2020 | Imai ..................... A63F 13/245 |
| 2020/0269130 | A1 | 8/2020 | Provancher et al. |
| 2022/0342212 | A1* | 10/2022 | Price .................... G02B 27/017 |
| 2023/0010006 | A1* | 1/2023 | Goff ........................ G01S 19/54 |

FOREIGN PATENT DOCUMENTS

| | | |
|---|---|---|
| KR | 10-2014-0068855 A | 6/2014 |
| KR | 10-2018-0073120 A | 7/2018 |
| KR | 10-2021-0010437 A | 1/2021 |
| KR | 10-2270699 B1 | 6/2021 |
| KR | 10-2358997 B1 | 2/2022 |
| WO | 2012/178202 A1 | 12/2012 |
| WO | 2017/213939 A1 | 12/2017 |

OTHER PUBLICATIONS

Written Opinion dated Aug. 2, 2023, issued by the International Searching Authority in International Application No. PCT/KR2023/006541 (PCT/ISA/237).

* cited by examiner

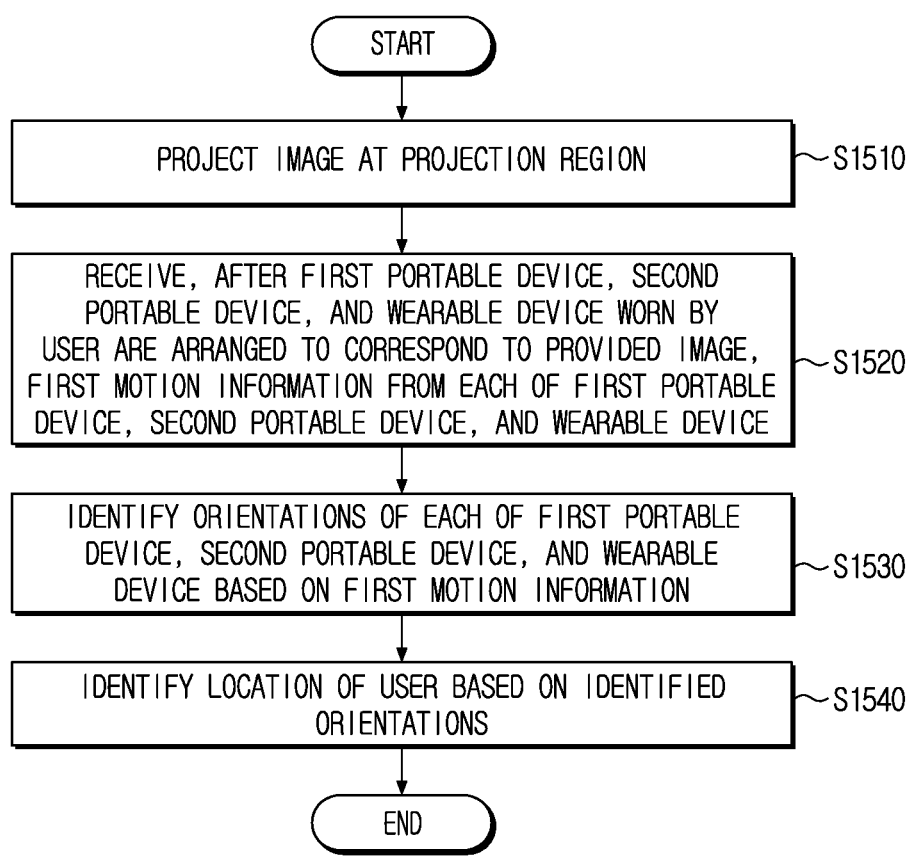

ELECTRONIC APPARATUS FOR IDENTIFYING A CONTROL SIGNAL BASED ON MOTION INFORMATION AND CONTROL METHOD THEREOF

CROSS-REFERENCE TO RELATED APPLICATIONS

This application is a continuation of International Application No. PCT/KR2023/006541, filed on May 15, 2023, in the Korean Intellectual Property Receiving Office and claims priority under 35 U.S.C. § 119 to Korean Patent Application No. 10-2022-0098118, filed on Aug. 5, 2022 and Korean Patent Application No. 10-2022-0120199, filed on Sep. 22, 2022, in the Korean Intellectual Property Office, the disclosures of each which are incorporated by reference herein in their entireties.

BACKGROUND

1. Field

The disclosure relates to electronic apparatuses and a control method thereof, and more particularly, to an electronic apparatus that identifies a control signal based on motion information and a control method thereof.

2. Description of Related Art

With developments in electronic technology, electronic apparatuses of various types are being developed. In particular, electronic apparatuses for providing content to users through a large scale screen or an immersive screen are currently in development.

A user may control an electronic apparatus through a portable device. The portable device may use an optical sensor such utilizing infrared radiation (IR) to estimate a pointing direction. However, in a space in which the large-scale screen, the immersive screen, or a multi-projector display is included, the user may move freely, but there is a limit to using the optical sensor that requires a line-of-sight (LOS) operation.

Furthermore, in order to interact with content displayed in a wide space, a location (or position) of the user may be required. However, there is a problem of requiring a camera or a complicated sensor to track the location of the user.

SUMMARY

According to one or more embodiments, an electronic apparatus, comprising: projection circuitry; a communication interface; and at least one processor connected with the projection circuitry and the communication interface and configure to control the electronic apparatus, wherein the processor is configured to: control the projection circuitry to project an image towards a projection region, receive first motion information from each of a first portable device, a second portable device, and a wearable device through the communication interface after the first portable device, the second portable device, and the wearable device worn by a user are arranged to correspond to the image, identify orientations of each of the first portable device, the second portable device, and the wearable device based on the first motion information, and identify a location of the user based on identified orientations.

The processor is configured to: receive, after identification of the location of the user, second motion information from each of the first portable device, the second portable device, and the wearable device through the communication interface, and update the location of the user based on the second motion information.

The electronic apparatus further comprising: a memory stored with a look-up table, wherein the processor is configured to: identify a first angle formed by a first straight line moving from the user toward a front of the user and a second straight line parallel to an orientation of the first portable device and a second angle formed by a third straight line moving from the user toward the front of the user and a fourth straight line parallel with an orientation of the second portable device, identify a distance corresponding to the first angle and the second angle based on the look-up table, and identify the location of the user based on the identified distance.

Each of the first portable device, the second portable device, and the wearable device comprise an inertial measurement sensor, and the first motion information comprises: information about at least one of a roll, a pitch, or a yaw measured through the inertial measurement sensors of each of the first portable device, the second portable device, and the wearable device.

The processor is configured to: control the projection circuitry to project a pointer towards one point of the projection region based on at least one orientation from among the first portable device or the second portable device.

The processor is configured to: identify a gaze of the user based on the first motion information received from the wearable device, and identify one region of the projection region corresponding to a field of view of the user based on the gaze of the user.

The processor is configured to: control, based on the one point of the projection region corresponding to the at least one orientation from among the first portable device or the second portable device falling outside the one region, the projection circuitry to project the pointer towards an edge of the one region.

The processor is configured to: change, based on a pre-set control signal being received from at least one of the first portable device or the second portable device through the communication interface while the pointer is in a projected state towards the edge of the one region, a size of the one region.

The projection region is implemented as a screen with at least one projection surface having a size greater than or equal to a pre-set size or as an immersive screen comprising at least two projection surfaces.

The first portable device and the second portable device are each grasped by the user, and the wearable device is configured to be worn on a head of the user.

An electronic apparatus, comprising: a display; a communication interface; and at least one processor connected with the display and the communication interface and configured to control the electronic apparatus, wherein the processor is configured to control the display to display an image, receive first motion information from each of a first portable device, a second portable device, and a wearable device through the communication interface, after the first portable device, the second portable device, and the wearable device worn by a user are arranged to correspond to the image, identify orientations of each of the first portable device, the second portable device, and the wearable device based on the first motion information, and identify a location of the user based on identified orientations.

A control method of an electronic apparatus, the method comprising: projecting an image towards a projection region; receiving first motion information from each of a first portable device, a second portable device, and a wearable device after the first portable device, the second portable device, and the wearable device worn by a user are arranged to correspond to the image; identifying orientations of each of the first portable device, the second portable device, and the wearable device based on the first motion information; and identifying a location of the user based on the identified orientations.

The method further comprising: receiving, after identifying the location of the user, second motion information from each of the first portable device, the second portable device, and the wearable device; and updating the location of the user based on the second motion information.

The identifying the location of the user comprises: identifying a first angle formed by a first straight line moving from the user toward a front of the user and a second straight line parallel to an orientation of the first portable device and a second angle formed by a third straight line moving from the user toward a front of the user and a fourth straight line parallel with an orientation of the second portable device, identifying a distance corresponding to the first angle and the second angle based on a look-up table, and identifying the location of the user based on the identified distance.

The first motion information comprises information about at least one of a roll, a pitch, or a yaw measured through an inertial measurement sensor of each of the first portable device, the second portable device, and the wearable device.

The method further comprising: projecting a pointer towards one point of the projection region based on at least one orientation from among the first portable device or the second portable device.

The method further comprising: identifying a gaze of the user based on the first motion information received from the wearable device; and identifying one region of the projection region corresponding to a field of view of the user based on the gaze of the user.

The method further comprising: projecting, based on the one point of the projection region corresponding to the at least one orientation from among the first portable device or the second portable device falling outside the one region, the pointer towards an edge of the one region.

The method further comprising: changing, based on a pre-set control signal being received from at least one of the first portable device or the second portable device while the pointer is in a projected state towards the edge of the one region, a size of the one region.

The projection region is implemented as a screen with at least one projection surface having a size greater than or equal to a pre-set size or as an immersive screen comprising at least two projection surfaces.

BRIEF DESCRIPTION OF THE DRAWINGS

FIG. 15 is a flowchart illustrating a control method of an electronic apparatus according to one or more embodiments.

DETAILED DESCRIPTION

Figure 1:
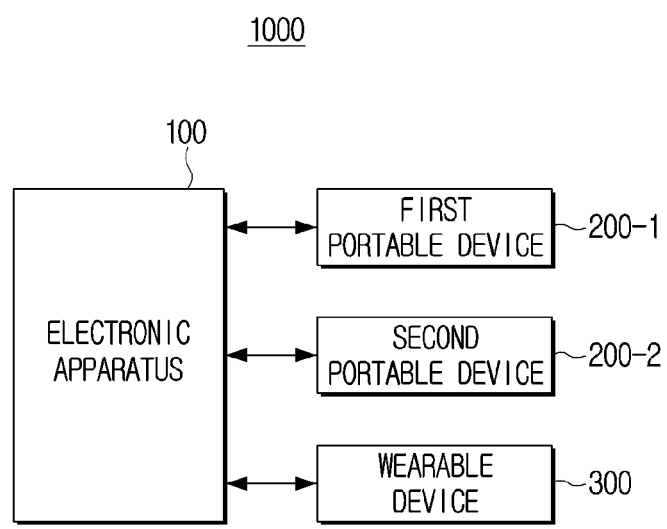
FIG. 1 is a block diagram illustrating an electronic system according to one or more embodiments.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Aspects of the disclosure are to provide a portable device/wearable device that transmits motion information without using an optical sensor, an electronic apparatus that identifies a control signal based on motion information received therefrom, and a control method thereof.

The disclosure will be described in detail below with reference to accompanying drawings.

Terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or a device (e.g., artificial intelligence electronic apparatus) using an electronic apparatus.

Various embodiments of the disclosure will be described in greater detail below with reference to the accompanied drawings.

FIG. 1 is a block diagram illustrating an electronic system 1000 according to one or more embodiments. As shown in FIG. 1, the electronic system 1000 may include an electronic apparatus 100, a first portable device 200-1, a second portable device 200-2, and a wearable device 300. However, the one or more embodiments are not limited thereto, and the electronic system 100 may include the electronic apparatus 100, and may further include at least one from among the first portable device 200-1, the second portable device 200-2, or the wearable device 300.

The electronic apparatus 100 may receive motion information from at least one of the first portable device 200-1, the second portable device 200-2, or the wearable device 300. Based on the received motion information, the electronic apparatus 100 may identify an orientation of a device corresponding to the motion information based on the motion information. In one or more examples, the orientation may be posture information. The electronic apparatus 100 may identify a location of a user based on orientation information of each of the first portable device 200-1, the second portable device 200-2, and the wearable device 300.

The electronic apparatus 100 may identify a control command based on the orientation information of each of the first portable device 200-1, the second portable device 200-2, and the wearable device 300. For example, the electronic apparatus 100 may identify the control command based on a change in the orientation information of each of the first portable device 200-1, the second portable device 200-2, and the wearable device 300, and perform an operation corresponding to the identified control command.

The electronic apparatus 100 may identify a control command based on one of orientation information from among the first portable device 200-1, the second portable device 200-2, and the wearable device 300, and perform an operation corresponding to the identified control command. In one or more examples, the electronic apparatus 100 may identify a control command by combining orientation information of at least two from among the first portable device 200-1, the second portable device 200-2, and the wearable device 300.

The electronic apparatus 100 may be a device that projects an image towards a projection region through a projection part. In one or more examples, the may be a projector. In one or more examples, the electronic apparatus 100 may be a device that displays an image through a display, and may be a television (TV), or any other electronic apparatus known to one of ordinary skill in the art.

However, as understood by one of ordinary skill in the art, the embodiments are not limited to these configurations, and the electronic apparatus 100 may receive the motion information from at least one of the first portable device 200-1, the second portable device 200-2, or the wearable device 300, and may be any device that is configured to perform a corresponding operation. In one or more examples, the electronic apparatus 100 may receive the motion information. In one or more examples, a device that provides a screen corresponding to the motion information to the projector, the TV, or the like, may be implemented as a smartphone, a tablet, an augmented reality (AR) glass, a desktop personal computer (PC), a notebook, or any other device with a screen known to one of ordinary skill in the art.

For convenience of description below, the electronic apparatus 100 being implemented as a projector will be described.

Each of the first portable device 200-1 and the second portable device 200-2 may obtain motion information of each of the first portable device 200-1 and the second portable device 200-2, respectively, through an inertial measurement sensor (or inertial measuring unit (IMU) sensor). For example, each of the first portable device 200-1 and the second portable device 200-2 may obtain information about at least one of a roll, a pitch, or a yaw of each of the first portable device 200-1 and the second portable device 200-2, respectively, through the inertial measurement sensor. Each of the first portable device 200-1 and the second portable device 200-2 may have a respective inertial measurement sensor installed thereon.

The first portable device 200-1 and the second portable device 200-2 may transmit motion information to the electronic apparatus 100. For example, the first portable device 200-1 and the second portable device 200-2 may transmit motion information to the electronic apparatus 100 through a Bluetooth communication or a Wi-Fi communication.

The first portable device 200-1 may be implemented in a form that is grasped by a left hand of the user, and the second portable device 200-2 may be implemented in a form that is grasped by a right hand of the user. However, as understood by one of ordinary skill in the art, the embodiments are not limited to these configurations, and the first portable device 200-1 and the second portable device 200-2 may be any form or shape that is configured to be grasped by the user.

The first portable device 200-1 and the second portable device 200-2 may be implemented in a form that is combinable or separable. For example, a magnet may be provided at a junction part of the first portable device 200-1 and the second portable device 200-2, where attaching and detaching of the devices may be possible.

The wearable device 300 may obtain motion information of the wearable device 300 through the inertial measurement sensor. For example, the wearable device 300 may obtain information about at least one of a roll, a pitch, or a yaw of the wearable device 300 through the inertial measurement sensor.

The wearable device 300 may transmit motion information to the electronic apparatus 100. For example, the wearable device 300 may transmit motion information to the electronic apparatus 100 through the Bluetooth communication or the Wi-Fi communication.

The wearable device 300 may be implemented in a pair of earphone form to be worn in ears of the user. However, as understood by one of ordinary skill in the art, the embodiments are not limited to these configurations, and the wearable device 300 may be in any form or shape configured to be worn on a head of the user. Furthermore, the wearable device 300 may be implemented in a form that is wearable on a body of the user.

Figure 2:
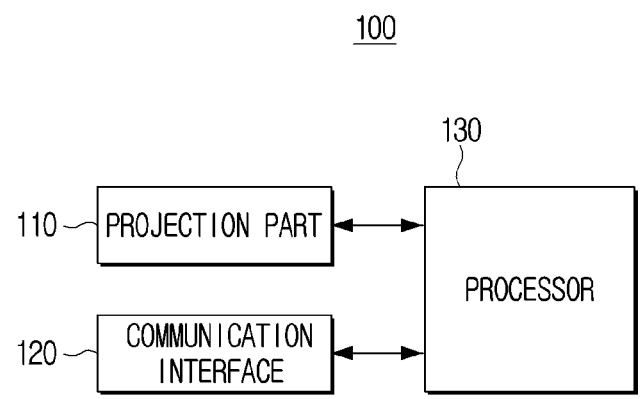
FIG. 2 is a block diagram illustrating a configuration of an electronic apparatus according to one or more embodiments.

FIG. 2 is a block diagram illustrating a configuration of the electronic apparatus 100 according to one or more embodiments. Referring to FIG. 2, the electronic apparatus 100 may include a projection part 110, a communication interface 120, and a processor 130.

The projection part 110 may be circuitry configured to project an image towards a projection region. Specifically, the projection part 110 may use a light source such as a lamp or a light emitting diode (LED) and project an image including at least one of content received from a source device and content that is pre-stored at the projection region.

The communication interface 120 may be configured to perform communication with external devices of various types according to communication methods of various types. For example, the electronic apparatus 100 may perform communication with the first portable device 200-1, the second portable device 200-2, or the wearable device 300 through the communication interface 120.

The communication interface 120 may include a Wi-Fi module, a Bluetooth module, an infrared communication module, a wireless communication module, or any other communication module known to one of ordinary skill in the art. In one or more examples, each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received. After communicatively connecting using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), or any other communication standard known to one of ordinary skill in the art, in addition to the above-described communication methods.

In one or more examples, the communication interface 120 may include wired communication interfaces such as, for example, and without limitation, HDMI, DP, Thunderbolt, USB, RGB, D-SUB, DVI, or any other communication interface known to one of ordinary skill in the art.

In addition thereto, the communication interface 120 may include at least one of the wired communication modules that perform communication using a local area network LAN) module, an Ethernet module, or a pair cable, a coaxial cable, an optical fiber cable, or any other cable known to one of ordinary skill in the art.

The processor 130 may control the overall operation of the electronic apparatus 100. For example, the processor 130 may control the overall operation of the electronic apparatus 100 by being connected with one or more components of the electronic apparatus 100. For example, the processor 130 may be connected with one or more components such as the projection part 110, the communication interface 120, a memory and control an operation of the electronic apparatus 100.

At least one processor 130 may include one or more from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 130 may control one element from the elements of the electronic apparatus 100 or a random combination thereof, and perform an operation associated with communication or data processing. The at least one processor 130 may execute one or more programs or instructions stored in the memory. For example, the at least one processor 130 may execute, by executing one or more instructions stored in the memory, a method according to one or more embodiments of the disclosure.

If the method according to one or more embodiments of the disclosure is included in a plurality of operations, the plurality of operations may be performed by one processor, or performed by a plurality of processors. For example, when a first operation, a second operation, and a third operation are performed by the method according to one or more embodiments, the first operation, the second operation, and the third operation may all be performed by a first processor, or the first operation and the second operation may be performed by the first processor (e.g., generic-purpose processor) and the third operation may be performed by a second processor (e.g., artificial intelligence dedicated processor).

The at least one processor 130 may be implemented as a single core processor that includes one core, or implemented as one or more multicore processors including a plurality of cores (e.g., homogeneous multicore or heterogeneous multicore). If the at least one processor 130 is implemented as a multicore processor, each of the cores included in the multicore processor may include an internal memory of a processor such as a cache memory or an on-chip memory, and a common cache that is shared by the plurality of cores may be included in the multicore processor. Furthermore, each of the cores (or a portion of the plurality of cores) included in the multicore processor may independently read a program command for implementing the method according to one or more embodiments of the disclosure and perform the program command, or read the program command for implementing the method according to one or more embodiments of the disclosure linked with all (or a portion) of the plurality of cores and perform the program command.

If the method according to one or more embodiments of the disclosure is included in the plurality of operations, the plurality of operations may be performed by one core from among the plurality of cores included in the multicore processor, or performed by the plurality of cores. For example, when the first operation, the second operation, and the third operation are performed by the method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments of the disclosure, the at least one processor 130 may mean one or more processors and a system on chip (SoC) integrated with other electronic components, a single core processor, a multicore processor, or a core included in the single core processor or the multicore processor, and the core referred herein may be implemented as the CPU, the GPU, the APU, the MIC, the DSP, the NPU, the hardware accelerator, the machine learning accelerator, or any other core processor structure known to one of ordinary skill in the art. However, the embodiments of the disclosure are not limited these configurations. However, for convenience of description, an operation of the electronic apparatus 100 will be described using the expression processor 130.

The processor 130 may control the projection part 110 to project an image towards a projection region, and after the first portable device 200-1, the second portable device 200-2, and the wearable device 300 worn by the user are arranged to correspond to the image. The processor 130 may further control the projection part 110 to receive the first motion information from each of the first portable device 200-1, the second portable device 200-2, and the wearable device 300 through the communication interface 120. For example, the processor 130 may control the projection part 110 to project an image that includes three points at the projection region. The user may gaze towards a center point from among the three points, and arrange the first portable device 200-1 to face a left point, and arrange the second portable device 200-2 to face a right point. Furthermore, the first portable device 200-1, the second portable device 200-2, and the wearable device 300 may transmit respective first motion information to the electronic apparatus 100. In one or more examples, the first motion information may include information about at least one of the roll, pitch, or yaw measured through the inertial measurement sensors of each of the first portable device 200-1, the second portable device 200-2, and the wearable device 300.

The electronic apparatus 100 may identify orientations of each of the first portable device 200-1, the second portable device 200-2, and the wearable device 300 based on the first motion information, and identify a location of the user based on the identified orientations. For example, the electronic apparatus 100 may further include a memory stored with a look-up table, and the processor 130 may identify a first angle formed by a straight line moving from the user toward a front of the user and a straight line parallel to an orientation of the first portable device 200-1 and a second angle formed by a straight line moving from the user toward a front of the user and a straight line parallel with an orientation of the second portable device 200-2. The processor 130 may identify a distance corresponding to the first angle and the second angle based on the look-up table, and identify a location of the user based on the identified distance. For example, the look-up table may be a table that includes the first angle and the second angle for each distance from the projection region.

The processor 130 may receive, after identifying the location of the user, second motion information from each of the first portable device 200-1, the second portable device 200-2, and the wearable device 300 through the communication interface 120, and update the location of the user based on the second motion information. For example, the processor 130 may update the location of the user based on the second motion information of the wearable device 300, and perform an operation corresponding to the second motion information of the first portable device 200-1 and the second portable device 200-2. In one or more examples, the processor 130 may perform an operation corresponding to the second motion information of the first portable device 200-1 and the second portable device 200-2 based on the updated location of the user.

The processor 130 may control the projection part 110 to project a pointer at one point of the projection region based on at least one orientation from among the first portable device 200-1 or the second portable device 200-2. The processor 130 may identify a gaze of the user based on the first motion information received from the wearable device 300, and identify one region of the projection region corresponding to a field of view of the user based on the gaze of the user. The processor 130 may control, based on one point of the projection region corresponding to at least one orientation from among the first portable device 200-1 or the second portable device 200-2 falling outside one region, the projection part 110 to project the pointer towards an edge of the one region.

However, as understood by one of ordinary skill in the art, the embodiments are not limited to these configurations, and the processor 130 may control, based on the one point of the projection region corresponding to the at least one orientation of one of the first portable device 200-1 or the second portable device 200-2 falling outside the one region, the projection part 110 to project a blinking pointer towards the edge of the one region. In one or more examples, the processor 130 may project the pointer towards the edge of the one region, and provide a notification sound through a speaker.

The processor 130 may change, based on a pre-set control signal being received from at least one of the first portable device 200-1 or the second portable device 200-2 through the communication interface 120 while the pointer is in a projected state at the edge of the one region, a size of the one region.

The projection region may be implemented as a screen with at least one projection surface greater than or equal to a pre-set size or an immersive screen including at least two projection surfaces.

If the electronic apparatus 100 is implemented in a form that includes a display, the processor 130 may control the display to display an image. The processor 130 may receive, after the first portable device 200-1, the second portable device 200-2, and the wearable device 300 worn by the user are arranged to correspond to the image, first motion information from each of the first portable device 200-1, the second portable device 200-2, and the wearable device 300 through the communication interface 120. The processor 130 may identify orientations of each of the first portable device 200-1, the second portable device 200-2, and the wearable device 300 based on the first motion information. Furthermore, the processor 130 may identify the location of the user based on the identified orientations.

Figure 3:
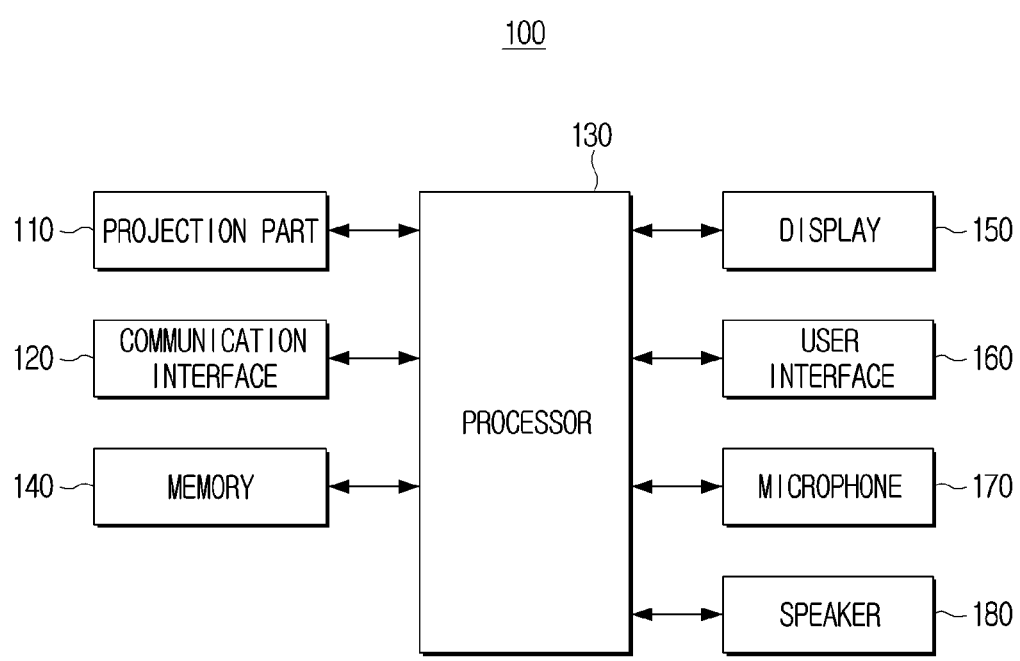
FIG. 3 is a block diagram illustrating a detailed configuration of an electronic apparatus according to one or more embodiments.

FIG. 3 is a block diagram illustrating a detailed configuration of the electronic apparatus 100 according to one or more embodiments.

FIG. 3 is a block diagram illustrating a detailed configuration of the electronic apparatus 100 according to one or more embodiments. The electronic apparatus 100 may include the projection part 110, the communication interface 120, and the processor 130. In addition, referring to FIG. 3, the electronic apparatus 100 may further include a memory 140, a display 150, a user interface 160, a microphone 170, and a speaker 180. Detailed descriptions of parts that overlap with elements shown in FIG. 2 from among the elements shown in FIG. 3 will be omitted.

The memory 140 may refer to a hardware that stores information such as data in electric or magnetic form for the processor 130, or any other memory structure known to one of ordinary skill in the art, to access data. For example, the memory 140 may be implemented as at least one hardware from among a non-volatile memory, a volatile memory, a flash memory, a hard disk drive (HDD) or a solid state drive (SSD), a random access memory (RAM), a read only memory (ROM), or any other memory structure known to one of ordinary skill in the art.

In the memory 140, at least one instruction necessary in an operation of the electronic apparatus 100 or the processor 130 may be stored. For example, the instruction may be a code unit that instructs an operation of the electronic apparatus 100 or the processor 130, and may be prepared in a machine language which is a language that can be understood by a computer. In one or more examples, the memory 140 may be stored with a plurality of instructions that perform a specific work of the electronic apparatus 100 or the processor 130 as an instruction set.

The memory 140 may be stored with data which is information in a bit or byte unit that can represent a character, a number, an image, or any other type of data known to one of ordinary skill in the art. For example, the memory 140 may be stored with a look-up table for identifying the location of the user, information about an operation based on the motion information, or any other suitable information known to one of ordinary skill in the art.

The memory 140 may be accessed by the processor 130 and reading, writing, modifying, deleting, updating, or any other suitable operation of the instruction, the instruction set, or data may be performed by the processor 130.

The display 150 may be a configuration that displays an image, and implemented as a display of various forms such as a liquid crystal display (LCD), an organic light emitting diode (OLED) display, and a plasma display panel (PDP). In the display 150, a driving circuit, which may be implemented in the form of an a-si TFT, a low temperature poly silicon (LTPS) TFT, an organic TFT (OTFT), or any other transistor structure known to one of ordinary skill in the art, a backlight unit, or any other display structure known to one of ordinary skill in the art may be included. The display 150 may be implemented as a touch screen coupled with a touch sensor, a flexible display, a three-dimensional display (3D display), or any other display structure known to one of ordinary skill in the art.

Even if the electronic apparatus 100 is implemented as a projector, a separate display 150 may be further included, and the processor 130 may provide information about an operating state of the electronic apparatus 100 through the display 150.

The user interface 160 may be implemented as a button, a touch pad, a mouse, a keyboard, and the like, or implemented also as a touch screen configured to perform a display function and an operation input function together therewith. In one or more examples, the button may be a button of various types such as a mechanical button, a touch pad, or a wheel which is formed at a random region at a front surface part or a side surface part, a rear surface part, or any other suitable location of an exterior of a main body of the electronic apparatus 100.

The microphone 170 may be a configuration for receiving sound and converting to an audio signal. The microphone 170 may be electrically connected with the processor 130, and may receive sound by the control of the processor 130.

For example, the microphone 170 may be formed as an integrated-type integrated to an upper side or a front surface direction, a side surface direction or the like of the electronic apparatus 100. In one or more examples, the microphone 170 may be provided in a separate remote controller, or any other suitable controller from the electronic apparatus 100. In this case, the remote controller may receive sound through the microphone 170, and provide the received sound to the electronic apparatus 100.

The microphone 170 may include various configurations such as a microphone that collects sound of an analog form, an amplifier circuit that amplifies the collected sound, an A/D converter circuit that samples the amplified sound and converts to a digital signal, a filter circuit that removes noise components from the converted digital signal, or any other microphone components known to one of ordinary skill in the art.

The microphone 170 may be implemented in a form of a sound sensor, and may be implemented by any method known to one of ordinary skill in the art for collecting sound.

The speaker 180 may be a component that outputs not only various audio data processed from the processor 130, but also various notification sounds, voice messages, or any other suitable sounds.

Each of the first portable device 200-1, the second portable device 200-2, and the wearable device 300 may include the inertial measurement sensor, and the first motion information may include information about at least one of the roll, pitch, or yaw measured through the inertial measurement sensor of each of the first portable device 200-1, the second portable device 200-2, and the wearable device 300.

For example, each of the first portable device 200-1, the second portable device 200-2, and the wearable device 300 may include at least one of a gyro sensor, an acceleration sensor, or a magnetometer sensor.

The gyro sensor may be a sensor for detecting a rotation angle of a device, and may measure a change in orientation of an object using properties that always maintain an initially set certain direction at a high degree of accuracy regardless of Earth rotation. The gyro sensor may be referred to as a gyroscope, and implemented in a mechanical method or in an optical method which uses light.

The gyro sensor may measure an angular speed. The angular speed may mean a rotating angle per time, and a measuring principle of the gyro sensor is as described below. For example, an angular speed in a horizontal state (standstill state) may be 0 degrees/sec, and then, if the object is inclined by 50 degrees while moving for 10 seconds, an average angular speed during the 10 seconds may be 5 degrees/sec. If the inclined angle of 50 degrees had been maintained in the standstill state, the angular speed may be 0 degrees/sec. Through this process, the angular speed changed from 0→5→0, and the angle became 50 degrees increasing from 0 degrees. To obtain the angle from in the angular speed, integration with respect to a whole time may be performed. Because the gyro sensor measures the angular speed as described above, an inclined angle may be calculated by integrating the angular speed for the whole time. However, the gyro sensor may generate an error due to an influence of temperature, and the error may be accumulated in the integration process causing a final value to be drifted. Accordingly, the device may further include a temperature sensor, and the error of the gyro sensor may be compensated by using the temperature sensor.

The acceleration sensor may be a sensor that measures an acceleration of a device or an intensity of impact, and may be referred to as an accelerometer. The acceleration sensor may detect one or more dynamic forces such as, for example, and without limitation, acceleration, vibration, impact, or any other suitable force. The acceleration sensor may be implemented in an inertial method, a gyro method, a silicon semiconductor method, or any other suitable method according to a detection method. For example, the acceleration sensor may be a sensor that senses a degree of inclination by a device using gravity acceleration, and may be formed as a 2-axis fluxgate or a 3-axis fluxgate.

The magnetometer sensor may be a sensor that measures an intensity and direction of Earth magnetism. The magnetometer sensor may include a sensor that measures an intensity of magnetization inherent in an object in a broader meaning, and may be referred to as a magnetometer. The magnetometer sensor may be implemented in a method of measuring an intensity of a magnetic field by hanging a magnet horizontally in the magnetic field and measuring a direction to which the magnet moves or rotating a coil in the magnetic field and measuring an induced electromotive force generated in the coil.

For example, a geomagnetic sensor that measures an intensity of Earth magnetism as a type of the magnetometer sensor may be implemented as a fluxgate-type geomagnetic sensor that detects Earth magnetism using a fluxgate. The fluxgate-type geomagnetic sensor may be a device that measures a size and direction of an external magnetic field by using a high permeability material such as permalloy as a magnetic core, applying an excitation magnetic field through a coil that winds the magnetic core, and measuring a second harmonic component that is proportionate to the external magnetic field generated according to a magnetic saturation of the magnetic core and non-linear magnetic properties. A current azimuth may be detected by measuring the size and direction of the external magnetic field, and a degree of rotation may be measured accordingly. The geomagnetic sensor may be formed of a 2-axis fluxgate or a 3-axis fluxgate. A 2-axis fluxgate sensor, that is a 2-axis sensor may correspond to a sensor formed of an X-axis fluxgate and a Y-axis fluxgate that are orthogonal to each other, and a 3-axis fluxgate (e.g., a 3-axis sensor) may correspond to a sensor added with a Z-axis fluxgate to the X-axis fluxgate and the Y-axis fluxgate.

When the geomagnetic sensor and the acceleration sensor are used as described above, the motion information of the device may be obtained, and obtaining of the posture may be possible through the motion information. For example, the motion information may be represented as a variation of the roll, a variation of the pitch, and a variation of the yaw, and the posture information may be represented as a roll angle, a pitch angle, and an azimuth.

The azimuth (yaw angle) may correspond an angle that changes in a left-right direction on a horizontal surface, and when the azimuth is calculated, a direction to which a device is to face may be known. For example, when the geomagnetic sensor is used, the azimuth may be measured through the equation below.

$$\Psi = \arctan(\sin \psi / \cos \psi) \quad \text{Eq. 1}$$

In one or more examples, the variables $\Psi$ represents the azimuth, and $\cos \Psi$ and $\sin \Psi$ represent a X-axis fluxgate output value and a Y-axis fluxgate output value.

The roll angle may correspond to an angle to which the horizontal surface is inclined laterally (left-right), and when the roll angle is calculated, a left gradient or a right gradient of the device may be known. The pitch angle may correspond to an angle to which the horizontal surface is inclined vertically (up-down), and when the pitch angle is calculated, a gradient angle of the device inclined toward an upper side or a lower side may be known. For example, when the acceleration sensor is used, the roll angle and the pitch angle may be measured with equations below.

$$\Phi = \arcsin(ay/g) \quad \text{Eq. 2}$$

$$\Theta = \arcsin(ax/g) \quad \text{Eq. 3}$$

In one or more examples, the variable g represents gravity acceleration, $\Phi$ represents the roll angle, $\Theta$ represents the pitch angle, ax represents an X-axis acceleration sensor output value, and ay represents a Y-axis acceleration sensor output value.

For example, if each of the first portable device 200-1, the second portable device 200-2, and the wearable device 300 provides the motion information to the electronic apparatus 100, the electronic apparatus 100 may obtain the posture information of each of the first portable device 200-1, the second portable device 200-2, and the wearable device 300 based on the received information.

However, as understood by one of ordinary skill in the art, the embodiments are not limited to these configurations, and the inertial measurement sensor may be any sensor configured to obtain the motion information or the posture information of the device.

Furthermore, each of the first portable device 200-1, the second portable device 200-2, and the wearable device 300 may directly obtain the orientation, and provide the orientation to the electronic apparatus 100.

As described above, the electronic apparatus 100 may identify the location of the user by obtaining orientations of portable devices, or any information indicating orientation, without an optical sensor such as an IR sensor or a camera, and perform a corresponding operation. Furthermore, the electronic apparatus 100 may control the pointer to be maintained within the field of view of the user such that usability and convenience may be improved in terms of interaction with the display. Further, the portable devices may be attachable and detachable such that user convenience is improved, and various types of interactions are possible.

Figure 4:
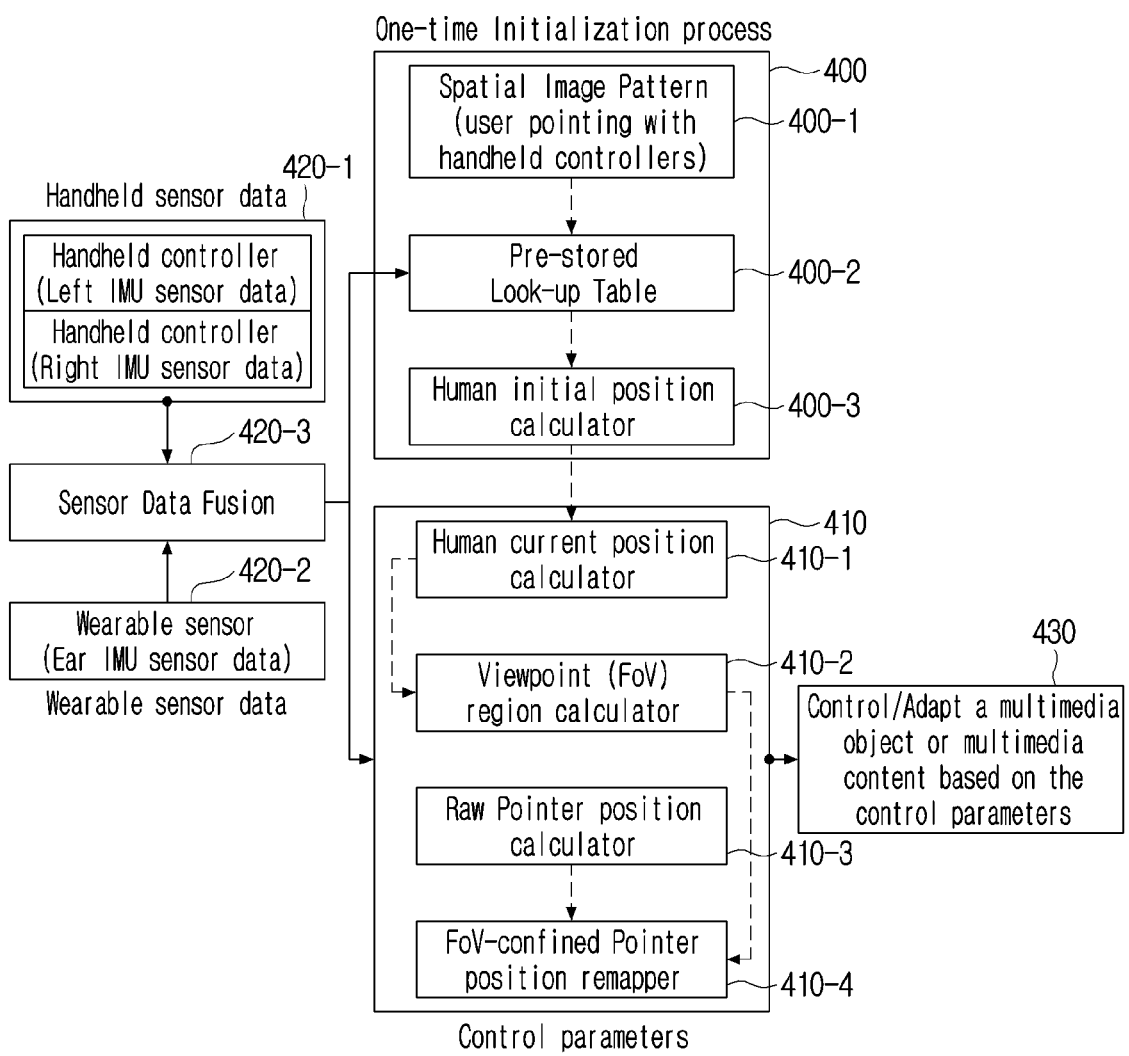
FIG. 4 is a diagram illustrating an overall operation of an electronic apparatus according to one or more embodiments.

An operation of the electronic apparatus 100 will be described in greater detail below through FIG. 4 to FIG. 14. In FIG. 4 to FIG. 4, separate embodiments will be described for convenience of description. However, the separate embodiments of FIG. 4 to FIG. 14 may be implemented in a combined state.

FIG. 4 is a diagram illustrating an overall operation of the electronic apparatus 100 according to one or more embodiments.

The processor 130 may perform an operation of identifying an initial location of the user (400), and an operation of identifying a position (or location) of the pointer.

First, the processor 130 may control the projection part 110 to project an image pattern towards a projection region (400-1). The processor 130 may receive sensor data 420-3 of one or more handheld controllers 420-1 such as the first portable device 200-1 and the second portable device 200-2 and a wearable sensor 420-2 such as the wearable device 300, and identify the position of the user (400-3) using the received sensor data with the look-up table (400-2). This position may be an initial position of the user.

After the initial positon is obtained, the processor 130 may calculate a current position of the user (410-1), and identify one region of the projection region that corresponds to the field of view (e.g., viewpoint) of the user (410-2). In one or more examples, the calculated current position is a refinement of the obtained initial position.

The processor 130 may identify one point of the projection region to which the pointer is to be projected based on the orientation of the handheld controller 420-1 (410-3), and project, based on the one point of the projection region falling outside the one region of the projection region corresponding to the field of view of the user, the pointer towards an edge of the one region (410-4).

The processor 130 may control a multimedia object or a multimedia content based on the sensor data 420-3 (430). For example, the processor 130 may change a size of the multimedia object or a position of the multimedia object based on the sensor data 420-3. The multimedia object or the multimedia content may be displayed on a projection surface such as a projection screen.

Figure 5:
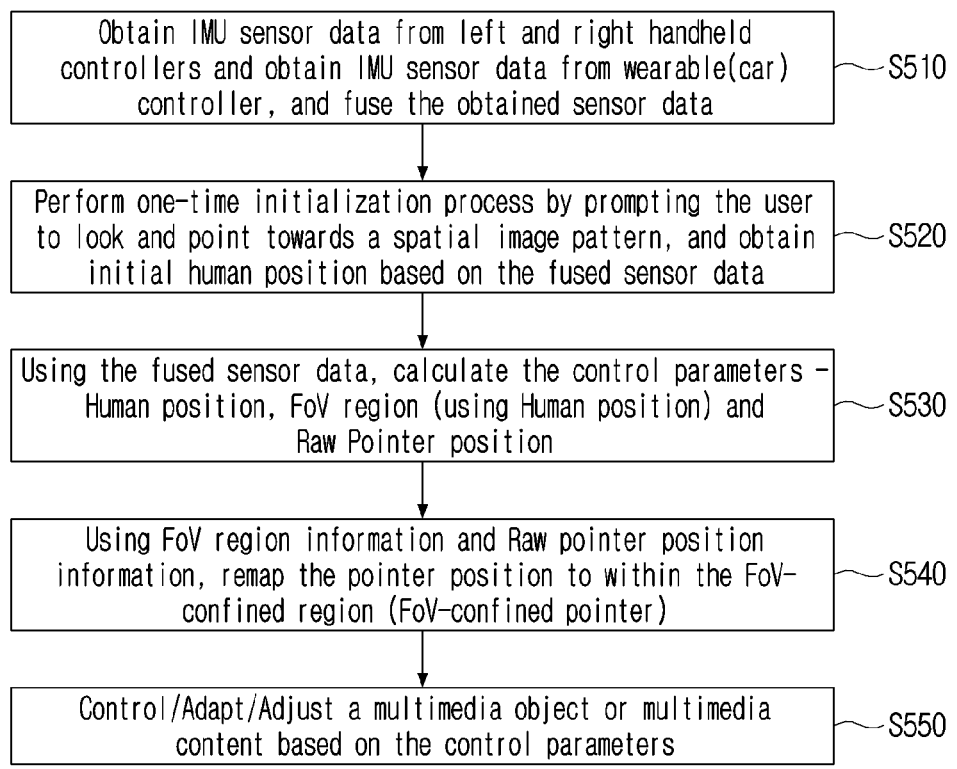
FIG. 5 is a flowchart illustrating an overall operation of an electronic apparatus according to one or more embodiments.

FIG. 5 is a flowchart illustrating an overall operation of the electronic apparatus 100 according to one or more embodiments.

In operation S510, the processor 130 may receive sensor data from the first portable device 200-1, the second portable device 200-2, and the wearable device 300, and process the sensor data. For example, the processor 130 may receive the first motion information from the first portable device 200-1, the second portable device 200-2, and the wearable device 300, and identify the orientations of the first portable device 200-1, the second portable device 200-2, and the wearable device 300 based on the first motion information.

In operation S520, the processor 130 may perform an initialization process (operation). For example, the processor 130 may project a pre-set image towards the projection region, and obtain various information by processing the sensor data received after the user performs the process based therefrom.

In operation S530, the processor 130 may identify at least one of position of the user, the field of view of the user, or the projection position of the pointer based on the received sensor data. For example, the processor 130 may identify the position of the user based on the orientations of the first portable device 200-1, the second portable device 200-2, and the wearable device 300. Furthermore, the processor 130 may identify the gaze of the user based on the first motion information received from the wearable device 300, and identify one region of the projection region corresponding to the field of view of the user based on the gaze of the user. Furthermore, the processor 130 may identify the projection position of the pointer based on at least one orientation from among the first portable device 200-1 or the second portable device 200-2.

In operation S540, the processor 130 may project, based on the projection position of the pointer which is based on at least one orientation from among the first portable device 200-1 or the second portable device 200-2 falling outside the one region of the projection region corresponding to the field of view of the user, the pointer towards an edge of the one region.

In operation S550, the processor 130 may perform control of the multimedia object or multimedia content based on the sensor data that is received thereafter.

After a one-time initialization process (operation) as described above is performed, the process of operation S550 may be continued. Furthermore, because an optical sensor is not used, identifying an accurate control signal may be possible even if there is movement by the user or another user.

Figure 6:
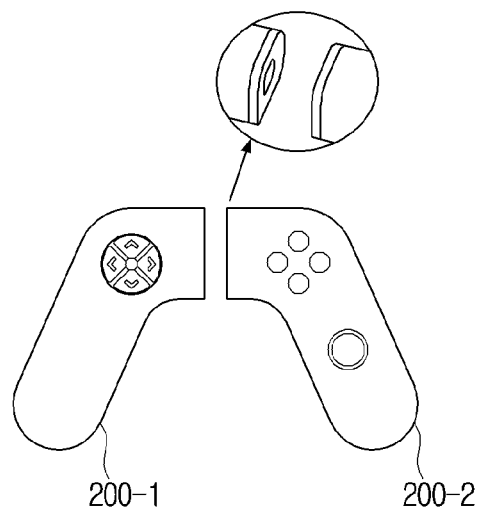
FIG. 6 is a diagram illustrating a portable device according to one or more embodiments.

FIG. 6 is a diagram illustrating a portable device according to one or more embodiments.

As shown in FIG. 6, the first portable device 200-1 and the second portable device 200-2 may be attachable or detachable. For example, the first portable device 200-1 and the second portable device 200-2 may be provided with a magnet at a contact surface thereof and may be attached or detached.

Furthermore, the first portable device 200-1 and the second portable device 200-2 may provide different control signals for when separated and for when combined to the electronic apparatus 100.

Figure 7:
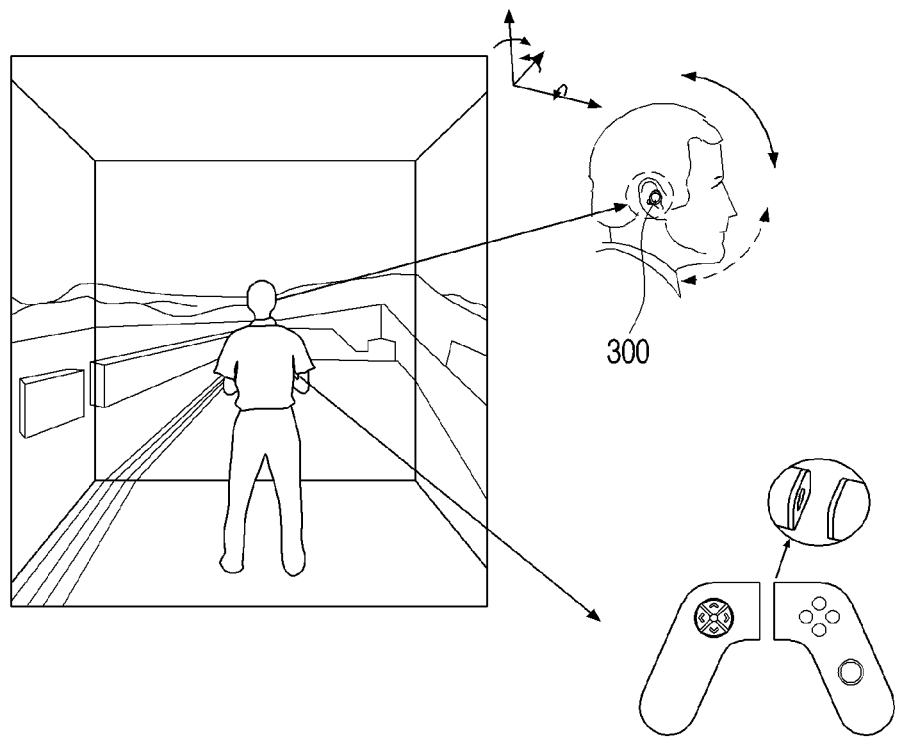
FIG. 7 is a diagram illustrating a projection region in a vicinity of a user according to one or more embodiments.

FIG. 7 is a diagram illustrating a projection region in a vicinity of the user according to one or more embodiments.

The projection region may be implemented, as shown in FIG. 7, as a screen having at least one projection surface greater than or equal to a pre-set size or as an immersive screen including at least two projection surfaces.

In one or more examples, the projection region in FIG. 7 may be implemented as a device that includes a plurality of displays or a device that includes a display that is bent 90 degrees.

The user may interact through the first portable device 200-1, the second portable device 200-2, and the wearable device 300.

Figure 8:
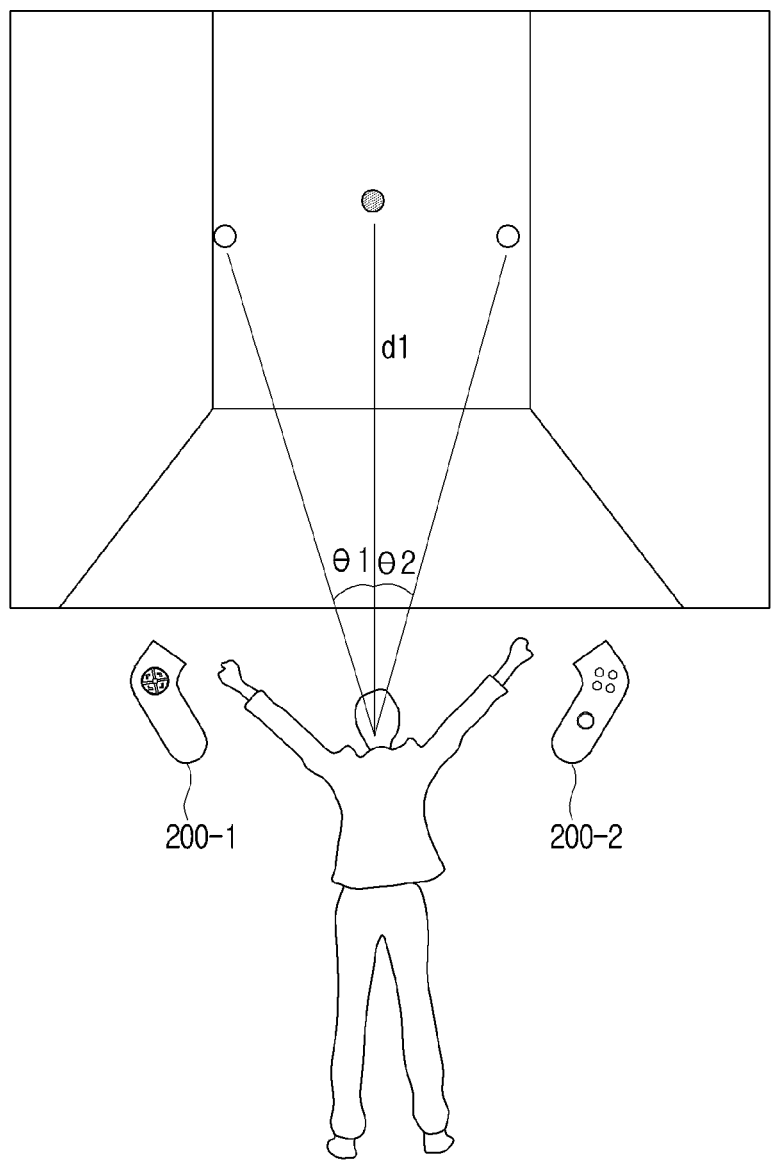
FIG. 8 and FIG. 9 are diagrams illustrating a method of identifying a location of a user according to one or more embodiments.
Figure 9:
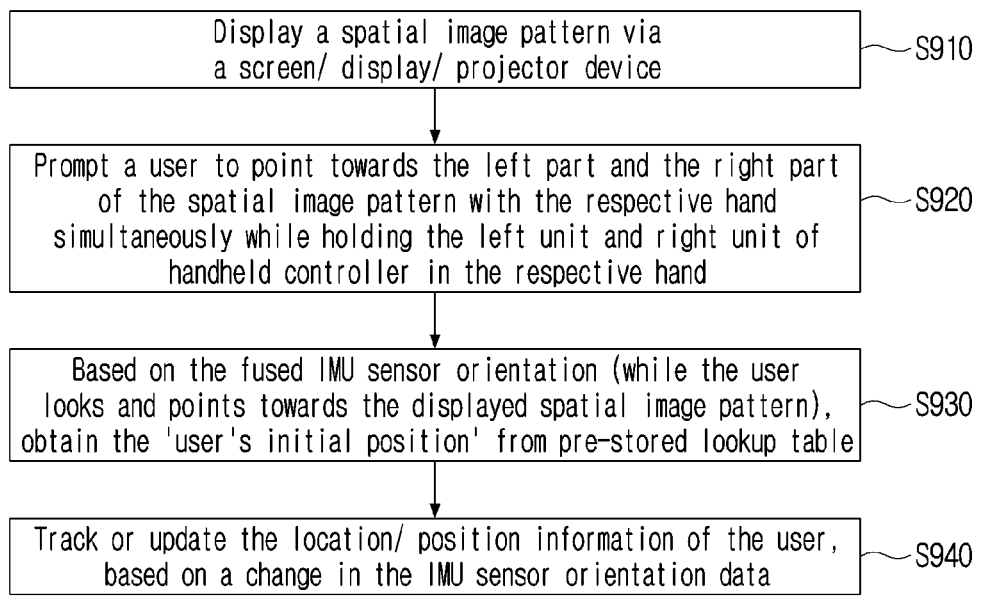

FIG. 8 and FIG. 9 are diagrams illustrating a method of identifying a location of the user according to one or more embodiments.

In operation S910, a spatial image pattern via a screen/display/projector device may be displayed. For example, the processor 130 may project, as shown in FIG. 8, an image including at least three points toward the projection region. The image may be a spatial image pattern via a screen/display/projector device. In one or more examples, the image including three points may be an image for guiding a user action.

In operation S920, the user may be prompted to point towards the left part and the right part of the spatial image pattern with the respective hand simultaneously while holding the a left unit (e.g., 200-1) and a right unit (e.g., 200-2) of the handheld controller. As a result of the prompt, the user may gaze towards a center point from among the three points, arrange the first portable device 200-1 to face the left point, and arrange the second portable device 200-2 to face the right point.

In operation S930, based on the fused IMU sensor orientation, while the user looks and points towards the displayed spatial image pattern, the user's initial position from a pre-stored lookup table. For example, the processor 130 may be configured such that the first portable device 200-1, the second portable device 200-2, and the wearable device 300 respectively receive the first motion information (S930), and the first portable device 200-1, the second portable device 200-2, and the wearable device 300 identify respective orientations based on the first motion information, and identify the location (or position) of the user based on the identified orientations. In operation S940, the location/position of the user based on a change in the IMU sensor orientation data may be tracked or updated.

For example, the processor 130 may obtain, as shown in FIG. 8, $\ominus 1$ and $\ominus 2$ based on the orientations of the first portable device 200-1 and the second portable device 200-2, and identify the position of the user by identifying a distance dl that corresponds to $\ominus 1$ and $\ominus 2$ based on the look-up table stored in the memory 140. In one or more examples, if $\ominus 1$ and $\ominus 2$ are 180 degrees, the distance may be theoretically 0, and if $\ominus 1$ and $\ominus 2$ are 0 degrees, the distance may be theoretically infinite.

In FIG. 8, an example of the image including three points has been provided, but any method may be possible as long as it is a method that can guide the user.

Through the process described above, the position of the user may be identified without a camera or an IR sensor.

Figure 10:
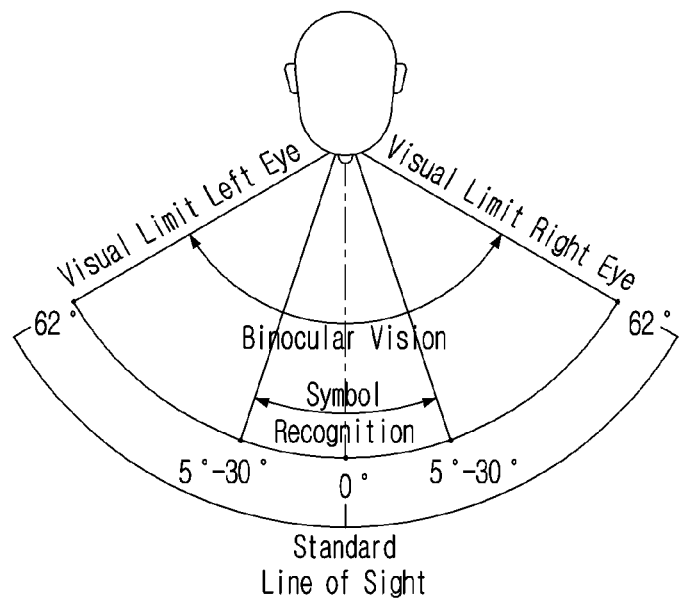
FIG. 10 and FIG. 11 are diagrams illustrating an region of a projection region corresponding to a field of view of a user according to one or more embodiments.
Figure 10:
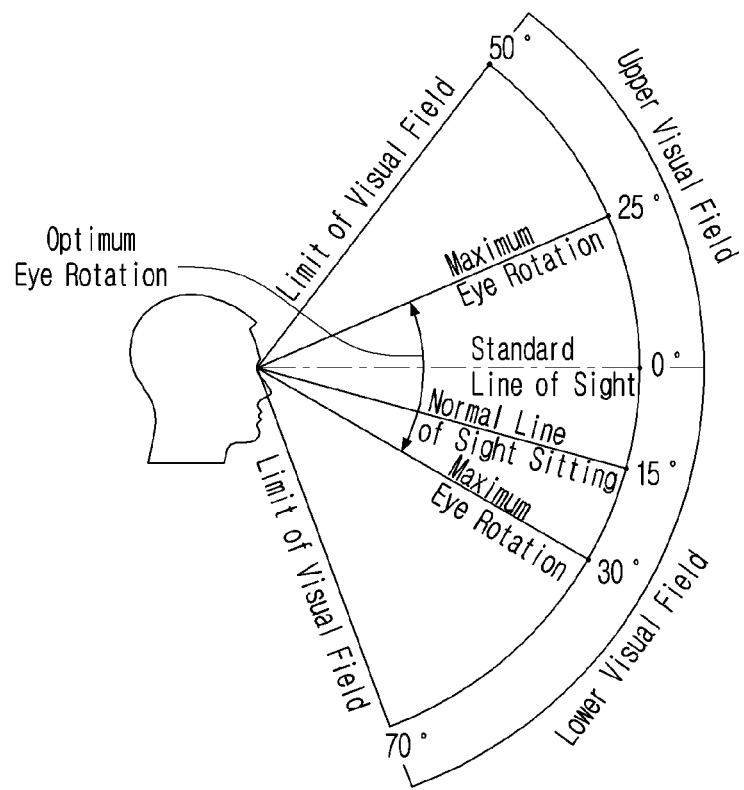
Figure 11:
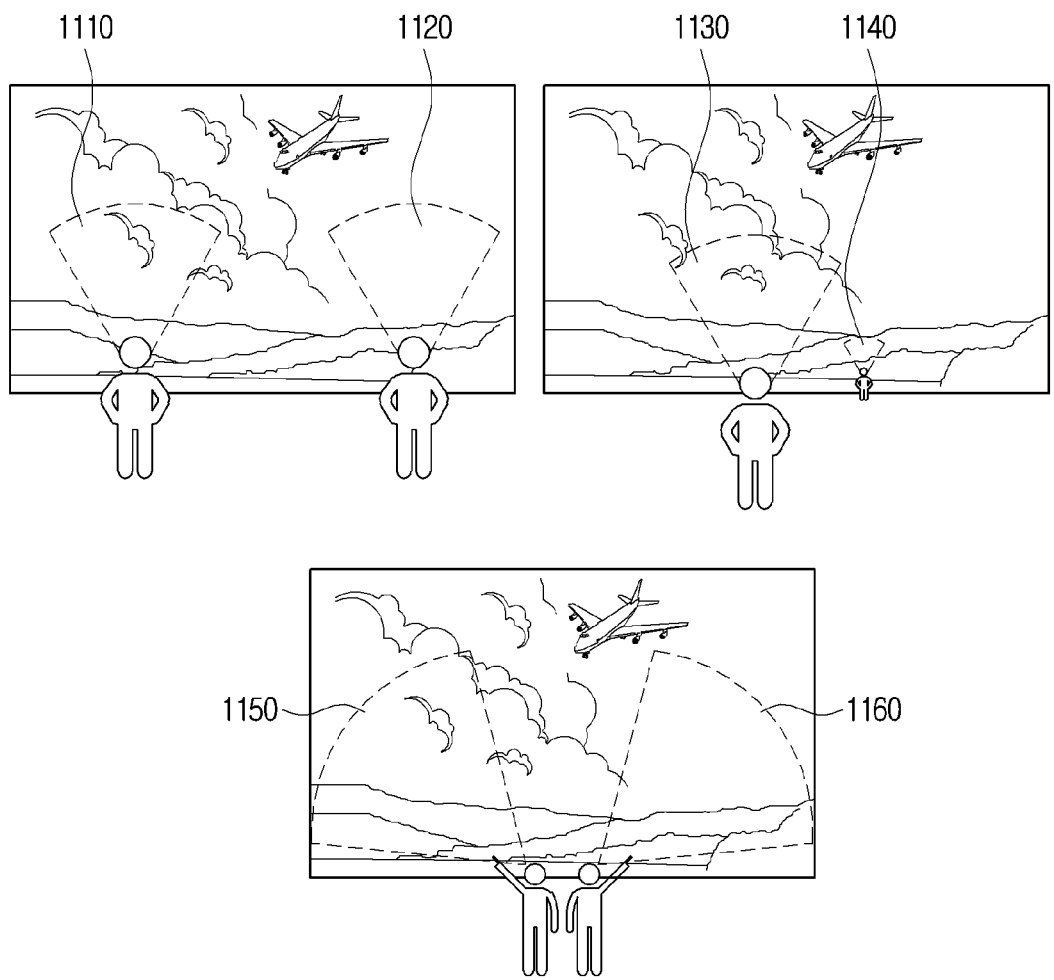

FIG. 10 and FIG. 11 are diagrams illustrating an region of a projection region corresponding to a field of view of the user according to one or more embodiments.

As shown in FIG. 10, the user may secure a certain field of view such as a field of view based on an eye movement, a field of view based on a neck movement, or any other movement of the user.

The processor 130 may identify the gaze of the user based on the first motion information received from the wearable device 300, and identify one region of the projection region corresponding to the field of view of the user based on the gaze of the user. In one or more examples, the one region of the projection region may be expanded or reduced according to the user.

However, as understood by one of ordinary skill in the art, the embodiments are not limited to these configurations, and the processor 130 may identify the one region of the projection region corresponding to the field of view of the user based on the first motion information received from the wearable device 300. For example, the processor 130 may identify the one region of the projection region corresponding to the field of view of the user based on a head direction of the user regardless of the gaze of the user.

As illustrated in the left upper end of FIG. 11, if a user moves to the right, the one region of the projection region corresponding to the field of view of the user may also be changed from region 1110 to region 1120.

In one or more examples, as illustrated in a right upper end of FIG. 11, if a person moves toward the projection region direction, the one region of the projection region corresponding to the field of view of the user may also be changed from region 1130 to region 1140.

In one or more examples, as illustrated in a lower end of FIG. 11, if the gaze of the user is changed from the left to the right, the one region of the projection region corresponding to the field of view of the user may also be changed from region 1150 to region 1160.

In one or more examples, the projection region may be implemented as a screen having at least one projection surface greater than or equal to a pre-set size or as an immersive screen including at least two projection surfaces. Accordingly, the region that the user is able to view is determined according to the movement of the user or the movement of the gaze of the user, and the gaze of the user may not reach the remaining areas. Accordingly, it may be difficult for the user to identify the position of the pointer.

Figure 12:
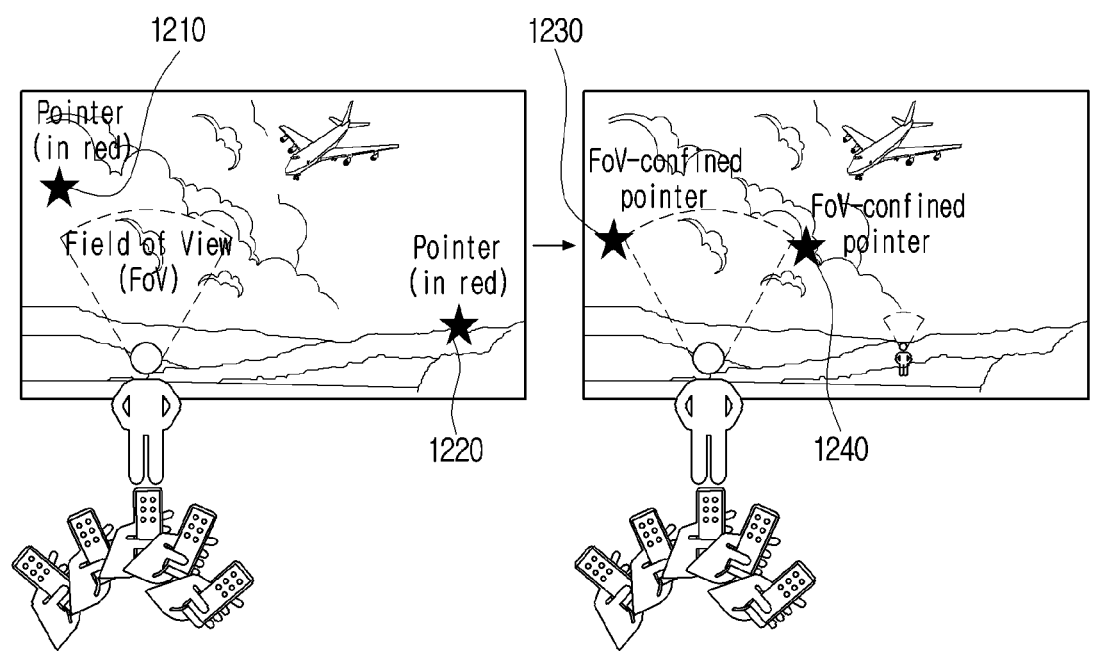
FIG. 12 and FIG. 13 are diagrams illustrating one region of a projection region corresponding to a field of view of a user and a projection location of a pointer according to one or more embodiments.
Figure 13:
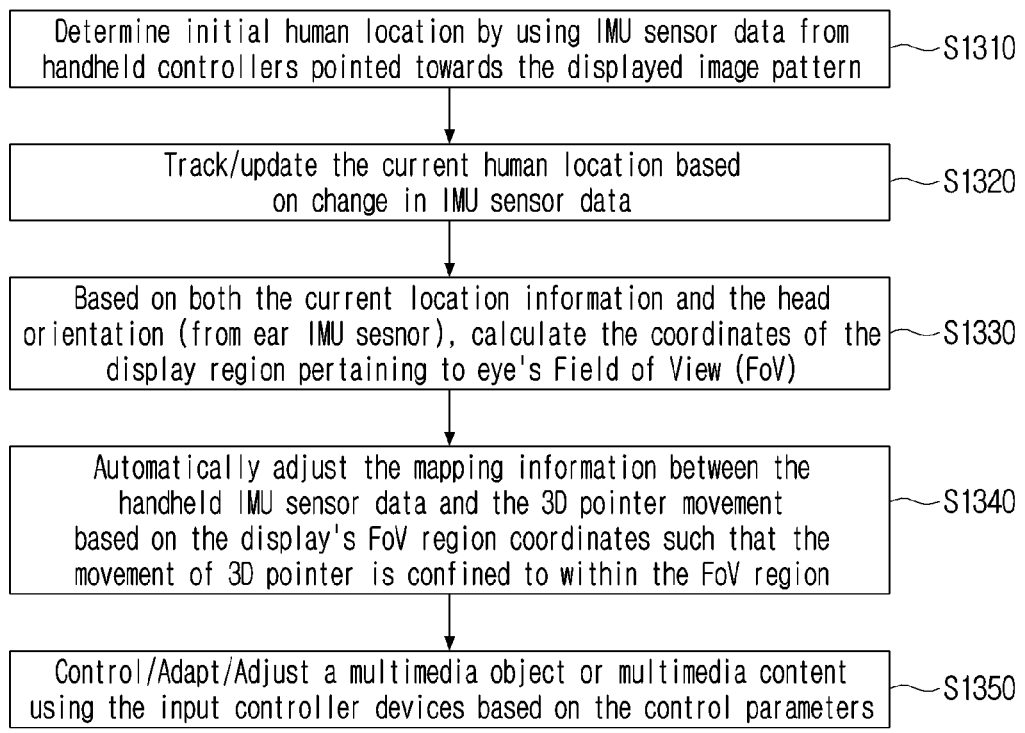

FIG. 12 and FIG. 13 are diagrams illustrating one region of a projection region corresponding to a field of view of the user and a projection location of a pointer according to one or more embodiments.

In operation S1310, the initial location of the user may be determined by using IMU sensor data from handheld controllers pointed towards the displayed image pattern. For example, the processor 130 may identify the location of the user. In operation S1320, the location of the user is updated based on sensor data such as the IMU sensor data that is received continuously.

In operation S1330, based on the current location information and head orientation (e.g., from ear IMU sensor, the coordinates of the display region pertaining to the user eye's field of view (FoV) is calculated. For example, the processor 130 may identify the one region of the projection region corresponding to the field of view of the user based on the location of the user and the sensor data received from the wearable device 300.

In operation S1340, the mapping information between the handheld IMU sensor data and the 3D pointer movement based on the display's FoV region coordinates such that the movement of 3D pointer is confined to within the FoV region is automatically adjusted. The processor 130 may project, based on one point of the projection region corresponding to at least one orientation from among the first portable device 200-1 or the second portable device 200-2 being within the one region of the projection region corresponding to the field of view of the user, the pointer towards the one point of the projection region corresponding to the at least one orientation from among the first portable device 200-1 or the second portable device 200-2, and project, based on the one point of the projection region corresponding to at least one orientation from among the first portable device 200-1 or the second portable device 200-2 falling outside the one region of the projection region corresponding to the field of view of the user, the pointer towards the edge of the one region.

In one or more examples, as shown in the left of FIG. 12, according to the related art, the pointer may be projected towards point 1210 or point 1220 regardless on the one region of the projection region corresponding to the field of view of the user. For example, according to the disclosure, the processor 130 may be configured such that the user is able to identify the pointer by projecting the pointer at the edge of the one region of the projection region corresponding to the field of view of the user even if the portable device faces point 1210 or point 1220 as shown in the right of FIG. 12.

Figure 14:
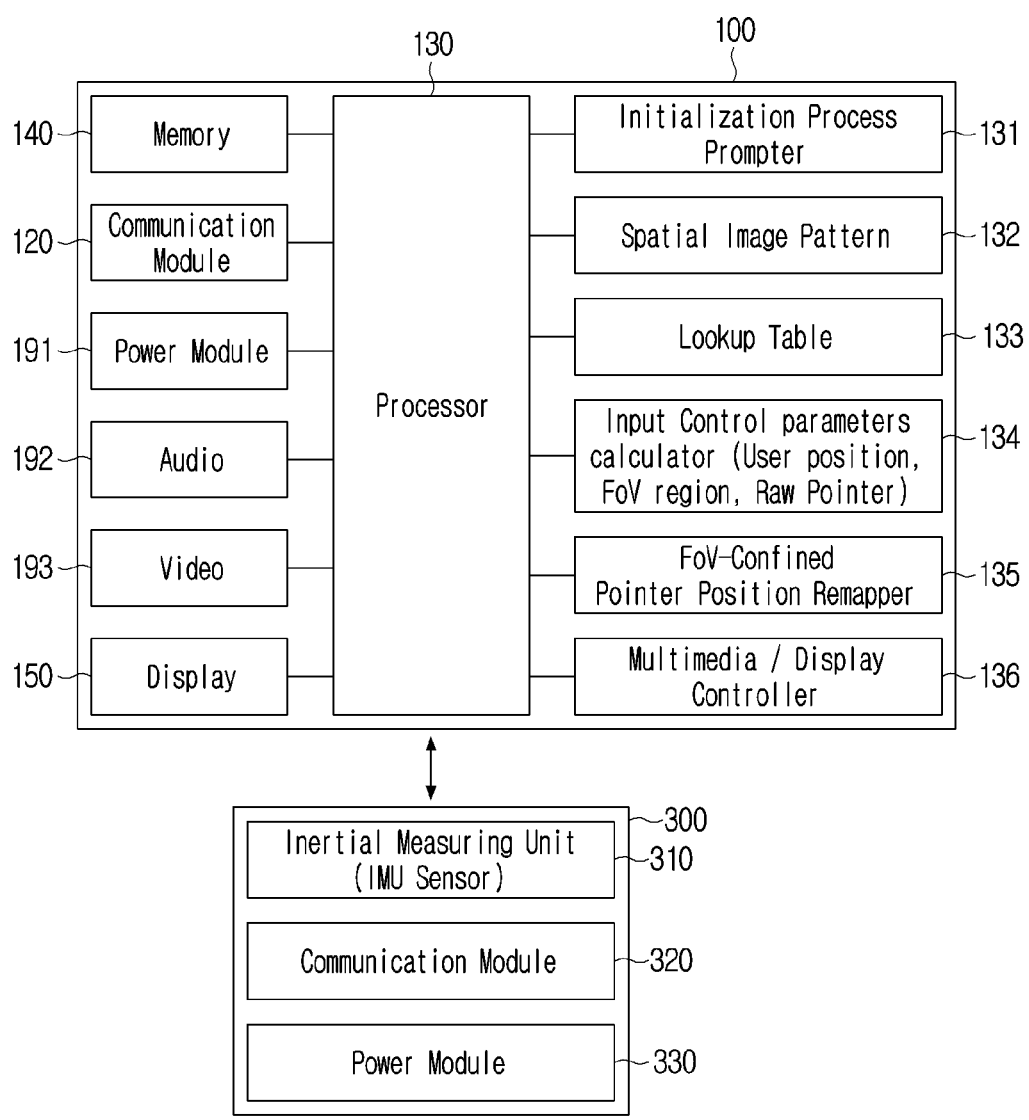
FIG. 14 is a diagram illustrating detailed configurations of an electronic apparatus and a portable device according to one or more embodiments.

FIG. 14 is a diagram illustrating detailed configurations of an electronic apparatus and a portable device according to one or more embodiments. Descriptions on the configurations that overlap with the previous drawing from among the configurations shown in FIG. 14 may be omitted.

The electronic apparatus 100 may further include a power module 191, an audio 192, and a video 193. The power module 191 may be a configuration for supplying power to the electronic apparatus 100, the audio 192 may be a configuration for processing audio content, and the video 193 may be a configuration for processing video content.

The processor 130 may include an initialization module 131, an image pattern module 132, a look-up table module 133, a sensor data processing module 134, a pointer control module 135, and a control module 136. Each module may be implemented as a hardware as a configuration of the processor 130. However, as understood by one of ordinary skill in the art, the embodiments are not limited to these configurations, and operations of the respective components may be implemented as a software and implemented in a form stored in the memory 140.

The processor 130 may start with the operation for identifying the location of the user and the like through the initialization module 131. The processor 130 may project an image guiding a user action at the projection region through the image pattern module 132. The processor 130 may identify the location of the user based on the look-up table module 133, identify the orientation of the portable device through the sensor data processing module 134, and limit the projection region of the pointer to within the one region of the projection region corresponding to the field of view of the user through the pointer control module 135. The processor 130 may perform an operation corresponding to the sensor data through the control module 136.

FIG. 15 is a flowchart illustrating a control method of an electronic apparatus according to one or more embodiments.

In operation S1510, an image may be projected towards the projection region. In operation S1520, after the first portable device, the second portable device, and the wearable device worn by the user are arranged to correspond to the provided image, the electronic apparatus may receive the first motion information from each of the first portable device, the second portable device, and the wearable device. In operation S1530, the orientations of each of the first portable device, the second portable device, and the wearable device may be identified based on the first motion information. In operation S1540, the location of the user may be identified based on the identified orientations.

In one or more examples, after identifying the location of the user, receiving the second motion information from each of the first portable device, the second portable device, and the wearable device and updating the location of the user based on the second motion information may be further included.

The identifying the location of the user in operation S1540 may include identifying the first angle formed by a straight line moving from the user toward the front of the user and a straight line parallel to the orientation of the first portable device and a second angle formed by a straight line moving from the user toward the front of the user and a straight line parallel with the orientation of the second portable device, identifying a distance corresponding to the first angle and the second angle based on the look-up table, and identifying the location of the user based on the identified distance.

Furthermore, the first motion information may include information about at least one of the roll, pitch, or yaw measured through the inertial measurement sensor of each of the first portable device, the second portable device, and the wearable device.

Projecting the pointer towards the one point of the projection region based on the at least one orientation from among the first portable device or the second portable device may be further included.

In one or more examples, identifying the gaze of the user based on the first motion information received from the wearable device and identifying the one region of the projection region corresponding to the field of view of the user based on the gaze of the user may be further included.

Further, the projecting the pointer may include projecting, based on the one point of the projection region corresponding to the at least one orientation from among the first portable device or the second portable device falling outside the one region, the pointer at the edge of the one region.

In one or more examples, changing, based on a pre-set control signal being received from at least one of the first portable device or the second portable device while the pointer is in a projected state at the edge of the one region, the size of the one region may be further included.

The projection region may be implemented as a screen greater than or equal to the pre-set size or as an immersive screen including at least two projection surfaces.

Furthermore, the first portable device and the second portable device may be grasped by the user, and the wearable device may be worn at the head of the user.

According to one or more embodiments of the disclosure as described above, the electronic apparatus may identify the location of the user by obtaining the orientations of the portable devices, and the like, without an optical sensor such as an IR sensor or a camera, and perform an operation corresponding thereto.

Furthermore, the electronic apparatus may control for the pointer to be maintained within the field of view of the user improving usability and convenience in terms of an interaction with the display.

Further, user convenience may be improved because the portable devices are attachable or detachable, and various interaction may be possible.

In the above, the electronic apparatus has been described assuming that it is a projector, but even if it is a device that includes the display, the same operation as with the remaining operations excluding the operation associated with the display may be possible.

According to one or more embodiments of the disclosure, the various embodiments described above may be implemented with software including instructions stored in a machine-readable storage media (e.g., computer). The machine may call an instruction stored in the storage medium, and as a device operable according to the called instruction, may include an electronic apparatus (e.g., electronic apparatus (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments of the disclosure, the various embodiments described above may be implemented in a recordable medium which is readable by a computer or a device similar to the computer using software, hardware, or the combination of software and hardware. In some cases, embodiments described herein may be implemented by the processor on its own. According to a software implementation, embodiments such as the procedures and functions described herein may be implemented as separate software. Each software may perform one or more functions and operations described herein.

The computer instructions for performing processing operations in the device according to the various embodiments described above may be stored in a non-transitory computer-readable medium. The computer instructions stored in this non-transitory computer-readable medium may cause a specific device to perform a processing operation of the device according to the above-described various embodiments when executed by a processor of the specific device. The non-transitory computer-readable medium may refer to a medium that stores data semi-permanently rather than storing data for a very short time, such as a register, a cache, a memory, or the like, and is readable by a device. Specific examples of the non-transitory computer-readable medium may include, for example, and without limitation, a compact disc (CD), a digital versatile disc (DVD), a hard disc, a Blu-ray disc, a USB, a memory card, a ROM, and the like.

In addition, each element (e.g., a module or a program) according to the various embodiments described above may be formed of a single entity or a plurality of entities, and some sub-elements of the abovementioned sub-elements may be omitted or other sub-elements may be further included in the various embodiments. Alternatively or additionally, some elements (e.g., modules or programs) may be integrated into one entity and perform the same or similar functions performed by each of the corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While the disclosure has been illustrated and described with reference to various embodiments thereof, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:
   projection circuitry;
   a communication interface; and
   at least one processor connected with the projection circuitry and the communication interface and configure to control the electronic apparatus,
   wherein the at least one processor is configured to:
      control the projection circuitry to project an image pattern towards a projection region,
      receive first motion information from each of a first portable device, a second portable device, and a wearable device worn by a user through the communication interface after the first portable device, the second portable device, and the wearable device are arranged to correspond to a first part, a second part, and a third part, respectively, of the image pattern,
      identify orientations of each of the first portable device, the second portable device, and the wearable device based on the first motion information, and
      identify a location of the user based on the identified orientations by determining a distance between the user and the projection region based on the identified orientations.

2. The electronic apparatus of claim 1, wherein the at least one processor is configured to:
   receive, after identification of the location of the user, second motion information from each of the first portable device, the second portable device, and the wearable device through the communication interface, and
   update the location of the user based on the second motion information.

3. The electronic apparatus of claim 1, further comprising:
   a memory stored with a look-up table,
   wherein the at least one processor is configured to:
      identify a first angle formed by a first straight line moving from the user toward a front of the user and a second straight line parallel to an orientation of the first portable device and a second angle formed by a third straight line moving from the user toward the front of the user and the second straight line parallel with an orientation of the second portable device,
      determine the distance between the projection region and the user based on identifying a distance corresponding to the first angle and the second angle based on the look-up table, and
      identify the location of the user based on the identified distance.

4. The electronic apparatus of claim 1, wherein
   each of the first portable device, the second portable device, and the wearable device comprise an inertial measurement sensor, and
   the first motion information comprises:
      information about at least one of a roll, a pitch, or a yaw measured through the inertial measurement sensors of each of the first portable device, the second portable device, and the wearable device.

5. The electronic apparatus of claim 1, wherein
   the at least one processor is configured to:
      control the projection circuitry to project a pointer towards one point of the projection region based on at least one orientation from among the first portable device or the second portable device.

6. The electronic apparatus of claim 5, wherein
   the at least one processor is configured to:
      identify a gaze of the user based on the first motion information received from the wearable device, and
      identify one region of the projection region corresponding to a field of view of the user based on the gaze of the user.

7. The electronic apparatus of claim 6, wherein
   the at least one processor is configured to:
      control, based on the one point of the projection region corresponding to the at least one orientation from among the first portable device or the second portable device falling outside the one region, the projection circuitry to project the pointer towards an edge of the one region.

8. The electronic apparatus of claim 7, wherein
   the at least one processor is configured to:
      change, based on a pre-set control signal being received from at least one of the first portable device or the second portable device through the communication interface while the pointer is in a projected state towards the edge of the one region, a size of the one region.

9. The electronic apparatus of claim 1, wherein
   the projection region is implemented as a screen with at least one projection surface having a size greater than or equal to a pre-set size or as an immersive screen comprising at least two projection surfaces.

10. The electronic apparatus of claim 1, wherein
    the first portable device and the second portable device are each grasped by the user, and
    the wearable device is configured to be worn on a head of the user.

11. An electronic apparatus, comprising:
    a display;
    a communication interface; and
    at least one processor connected with the display and the communication interface and configured to control the electronic apparatus,
    wherein the at least one processor is configured to:
       control the display to display an image pattern towards a projection region,
       receive first motion information from each of a first portable device, a second portable device, and a wearable device worn by a user through the communication interface, after the first portable device, the second portable device, and the wearable device are arranged to correspond to a first part, a second part, and a third part respectively, of the image pattern,
       identify orientations of each of the first portable device, the second portable device, and the wearable device based on the first motion information, and identify a location of the user based on the identified orientations by determining a distance between the user and the projection region based on the identified orientations.

12. A control method of an electronic apparatus, the method comprising:
  projecting an image pattern towards a projection region;
  receiving first motion information from each of a first portable device, a second portable device, and a wearable device worn by a user after the first portable device, the second portable device, and the wearable device are arranged to correspond to a first part, a second part, and a third part, respectively, of the image pattern;
  identifying orientations of each of the first portable device, the second portable device, and the wearable device based on the first motion information; and
  identifying a location of the user based on the identified orientations by determining a distance between the user and the projection region based on the identified orientations.

13. The method of claim 12, further comprising:
  receiving, after identifying the location of the user, second motion information from each of the first portable device, the second portable device, and the wearable device; and
  updating the location of the user based on the second motion information.

14. The method of claim 12, wherein
  the identifying the location of the user comprises:
    identifying a first angle formed by a first straight line moving from the user toward a front of the user and a second straight line parallel to an orientation of the first portable device and a second angle formed by a third straight line moving from the user toward a front of the user and the second straight line parallel with an orientation of the second portable device,
    determining the distance between the projection region and the user by identifying a distance corresponding to the first angle and the second angle based on a look-up table, and
    identifying the location of the user based on the identified distance.

15. The method of claim 12, wherein
  the first motion information comprises information about at least one of a roll, a pitch, or a yaw measured through an inertial measurement sensor of each of the first portable device, the second portable device, and the wearable device.

16. The method of claim 12, further comprising:
  projecting a pointer towards one point of the projection region based on at least one orientation from among the first portable device or the second portable device.

17. The method of claim 16, further comprising:
  identifying a gaze of the user based on the first motion information received from the wearable device; and
  identifying one region of the projection region corresponding to a field of view of the user based on the gaze of the user.

18. The method according to claim 17, further comprising:
  projecting, based on the one point of the projection region corresponding to the at least one orientation from among the first portable device or the second portable device falling outside the one region, the pointer towards an edge of the one region.

19. The method of claim 18, further comprising:
  changing, based on a pre-set control signal being received from at least one of the first portable device or the second portable device while the pointer is in a projected state towards the edge of the one region, a size of the one region.

20. The method of claim 12, wherein
  the projection region is implemented as a screen with at least one projection surface having a size greater than or equal to a pre-set size or as an immersive screen comprising at least two projection surfaces.

21. The electronic apparatus of claim 1, wherein each of the first portable device, the second portable device, and the wearable device comprise a gyro sensor that generates the first motion information,
  wherein the location of the user is determined based on the first motion information without using an optical sensor.

* * * * *